United States Patent
Erb et al.

(10) Patent No.: US 9,360,041 B2
(45) Date of Patent: Jun. 7, 2016

(54) DRIVE-IN BUSHING, MOTOR VEHICLE STRUCTURE AND METHOD AND TOOL FOR PRODUCING THE MOTOR VEHICLE STRUCTURE

(71) Applicant: Dr. Ing. h.c. F. Porsche Aktiengesellschaft, Stuttgart (DE)

(72) Inventors: Thiemo Erb, Stuttgart (DE); Markus Brunner, Sachsenheim (DE); Marc Cachaj, Friolzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/508,014

(22) Filed: Oct. 7, 2014

(65) Prior Publication Data
US 2015/0117977 A1 Apr. 30, 2015

(30) Foreign Application Priority Data
Oct. 31, 2013 (DE) .......................... 10 2013 112 014

(51) Int. Cl.
*F16B 37/04* (2006.01)
*F16B 39/22* (2006.01)
*B25B 27/00* (2006.01)
(Continued)

(52) U.S. Cl.
CPC ............ *F16B 39/225* (2013.01); *B25B 27/0007* (2013.01); *B25B 31/00* (2013.01); *F16B 37/00* (2013.01); *F16B 37/122* (2013.01); *F16B 11/006* (2013.01); *F16B 33/002* (2013.01); *Y10T 29/49948* (2015.01); *Y10T 29/53939* (2015.01)

(58) Field of Classification Search
CPC ...... F16B 11/006; F16B 33/002; F16B 37/00; F16B 37/14; F16B 37/122; F16B 39/225; F16B 37/04
USPC .................. 411/82, 82.3, 180, 187, 427, 546; 16/2.1, 2.2, 2.4
See application file for complete search history.

(56) References Cited

U.S. PATENT DOCUMENTS 2,190,622 A * 2/1940 Bahr ...................... B60Q 1/484
  403/197
2,409,638 A  10/1946 Lyon
(Continued)

FOREIGN PATENT DOCUMENTS

| | | |
|---|---|---|
| DE | 102008003789 | 7/2009 |
| DE | 102009048157 | 4/2011 |
| JP | 2008138739 | 6/2008 |

OTHER PUBLICATIONS

German Patent Appl. No. 10 2013 112 014.8—Search Report issued on Oct. 30, 2014.

*Primary Examiner* — Roberta Delisle
(74) *Attorney, Agent, or Firm* — Gerald E. Hespos; Michael J. Porco; Matthew T. Hespos

(57) ABSTRACT

A drive-in bushing (14) is provided for the releasable connection of a fiber-reinforced plastic first component of a motor vehicle structure to a fiber-reinforced plastic or metal second component of the motor vehicle structure. The drive-in bushing (14) has a sleeve-like basic body (15) manufactured from a metal and having an external wall (16) formed without a thread, and an internal wall (17) formed with an internal thread (18). The drive-in bushing (14) can be driven into a recess in the fiber-reinforced plastic of the first component (11). A screw penetrates a recess in the second component and can be screwed into the internal thread (18).

11 Claims, 3 Drawing Sheets

(51) Int. Cl.
    *F16B 37/00*   (2006.01)
    *B25B 31/00*   (2006.01)
    *F16B 37/12*   (2006.01)
    *F16B 11/00*       (2006.01)
    *F16B 33/00*       (2006.01)

(56) References Cited

U.S. PATENT DOCUMENTS

| | | | |
|---|---|---|---|
| D201,388 S * | 6/1965 | Pick | 411/427 |
| 3,434,521 A * | 3/1969 | Flora | F16B 5/06 411/166 |
| 3,722,565 A * | 3/1973 | Miller, Jr. | A47B 91/024 248/188.4 |
| 3,782,036 A | 1/1974 | Clark et al. | |
| 4,749,318 A * | 6/1988 | Bredal | F16B 37/122 411/180 |
| 4,895,485 A | 1/1990 | Guevara et al. | |
| 4,941,788 A * | 7/1990 | Highfield | F16B 37/122 411/178 |
| 5,244,326 A * | 9/1993 | Henriksen | F16B 37/145 411/180 |
| 5,452,977 A | 9/1995 | Terrizzi | |
| 5,564,873 A * | 10/1996 | Ladouceur | B23P 19/062 411/179 |
| 6,019,557 A * | 2/2000 | Lo | F16B 37/00 411/176 |
| 6,769,852 B2 * | 8/2004 | Nilsen | F16B 33/002 411/180 |
| 7,246,411 B2 * | 7/2007 | Campbell | E05D 15/0682 16/2.1 |
| 7,374,494 B2 | 5/2008 | Brewer et al. | |
| 8,226,339 B2 * | 7/2012 | Neri | F16B 37/067 411/161 |
| 2002/0021948 A1 * | 2/2002 | Stumpf | F16B 37/122 411/180 |
| 2002/0104187 A1 | 8/2002 | Kakamu et al. | |
| 2002/0182028 A1 * | 12/2002 | Hinn-Shing | F16B 5/02 411/180 |
| 2005/0084362 A1 * | 4/2005 | Nah | F16B 37/122 411/180 |
| 2008/0289143 A1 * | 11/2008 | Lu | F16B 37/061 16/2.4 |
| 2010/0054893 A1 | 3/2010 | Christ | |

\* cited by examiner

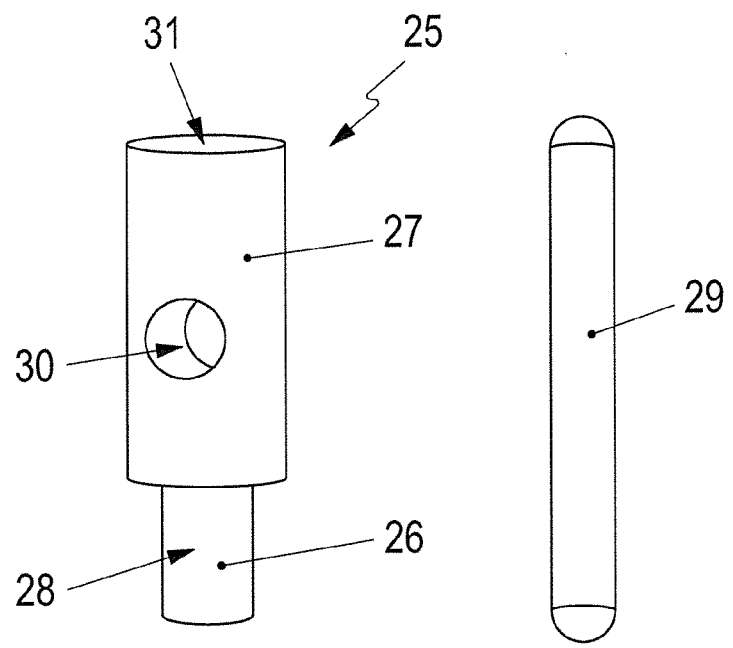
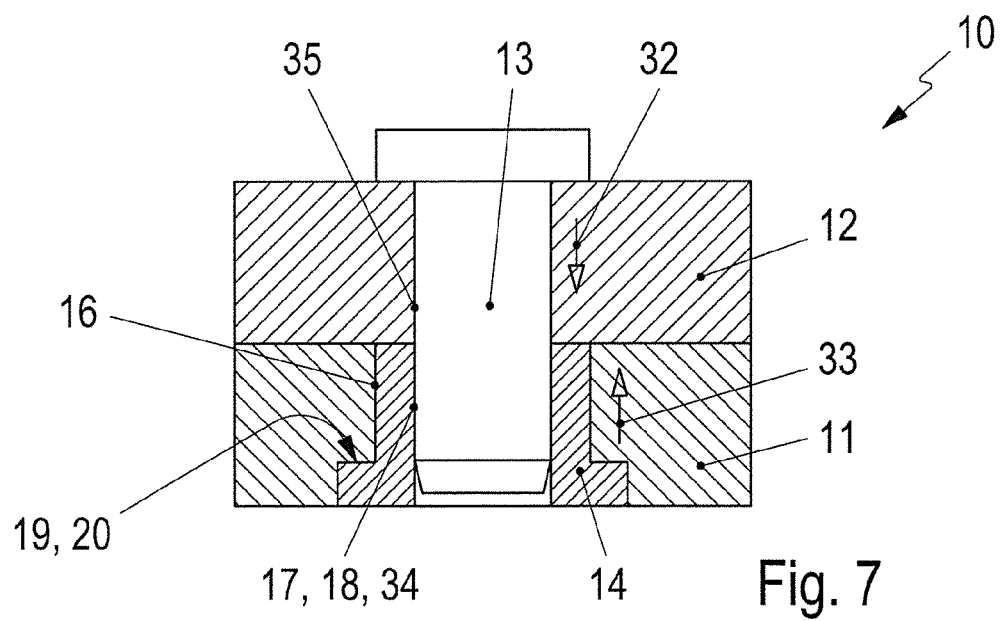
Fig. 5  Fig. 6
Fig. 7

DRIVE-IN BUSHING, MOTOR VEHICLE STRUCTURE AND METHOD AND TOOL FOR PRODUCING THE MOTOR VEHICLE STRUCTURE

CROSS-REFERENCE TO RELATED APPLICATION

This application claims priority on German Patent Application No. 10 2013 112 014.8, filed Oct. 31, 2013, the entire disclosure of which is incorporated herein by reference.

BACKGROUND

1. Field of the Invention

The invention relates to a drive-in bushing for the connection of components of a motor vehicle structure. The invention also relates to a motor vehicle structure and to a method and a tool for producing same.

2. Description of the Related Art

Motor vehicles are increasingly likely to have a fiber-reinforced plastic component that must be connected releasably to a component formed from plastic or metal. For example, a component of a body shell may be manufactured from a fiber-reinforced plastic and may have to be connected releasably to a chassis component that is formed from a metal. Additionally, this releasable connection must be able to absorb large forces. The expression releasably refers here to a repair situation of the motor vehicle and not to a normal use situation. Thus, such a release will only take place very rarely.

DE 10 2009 048 157 A1 discloses a technique for connecting a component made from a fiber composite material to a component made from metal. This technique integrates an insert part made from metal into the component made from the fiber composite material. The insert part has a threaded bore for receiving a threaded bushing is inserted into the threaded bore. A metal screw then interacts with the threaded bushing for connecting a component made from a metal to the component made from the fiber composite material.

An object of the invention is to provide a novel device for connecting two components of a motor vehicle structure, a novel motor vehicle structure and a method for producing same.

SUMMARY OF THE INVENTION

The invention relates to drive-in bushing for releasably connecting components of a motor vehicle structure, namely for screwing a first component made at least partly of a fiber-reinforced plastic to a second component made of plastic or metal. The drive-in bushing has a sleeve-like basic body that is manufactured from a metallic material. The basic body has an external wall and an internal wall. The external wall is formed without a thread. However, the internal wall of the basic body is formed with an internal thread. The drive-in bushing can be driven into a recess in the fiber-reinforced plastic of the first component. A screw penetrating a recess in the second component can be screwed into the internal thread.

The drive-in bushing can be connected to the fiber-reinforced plastic component without a metal insert being integrated into the fiber-reinforced plastic of the first component. Accordingly, the thread-free external wall of the drive-in metal bushing is connected directly to the fiber-reinforced plastic of the first component. A screw can be screwed into the internal thread of the drive-in bushing for connecting the second component to the first component.

At least one groove may be introduced into the external wall of the basic body and may extend in the longitudinal direction of the basic body. The groove interrupts the external thread in sections. The groove is a spreading groove for adhesive. The introduction of at least one spreading groove for adhesive positioned between the metal drive-in bushing and the fiber-reinforced plastic of the first component permits a particularly advantageous connection of the threaded bushing to the fiber-reinforced plastic of the first component so that high forces can be absorbed safely and reliably in a torsion-proof manner.

A collar may protrude radially out from an end region of the outer wall of the basic body to restrict a drive-in depth of the drive-in bushing into the recess of the first component.

A projection may be formed on the external wall of the basic body and may define means for preventing rotation.

Exemplary embodiments of the invention are explained in more detail with reference to the drawings, but without being restricted thereto.

BRIEF DESCRIPTION OF THE DRAWINGS

FIG. 5 shows a detail of the tool from FIG. 4.

FIG. 6 shows a further detail of the tool from FIG. 4.

FIG. 7 is a schematized cross section through a motor vehicle structure according to the invention.

DETAILED DESCRIPTION

Figure 1:
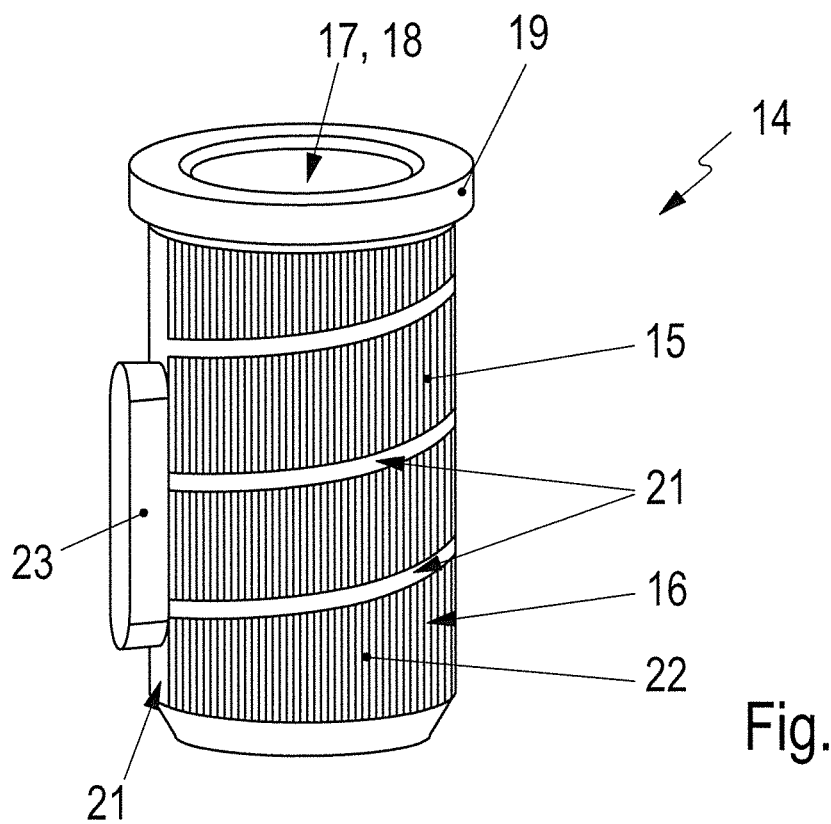
FIG. 1 is a perspective view of a first drive-in bushing according to the invention.

FIG. 7 is a highly schematized view of a motor vehicle structure 10 of a motor vehicle according to the invention has a first component 11 that is manufactured from a fiber-reinforced plastic, and a second component 12 that preferably is manufactured from metal. The first and second components 11 and 12 are connected releasably to each other by one or more screws 13.

The first component 11 preferably is a body component of a motor vehicle, for example a monocoque or a frame structure made from a carbon-fiber-reinforced or glass-fiber-reinforced plastic. The second component 12 is made of metal and preferably is a chassis component, such as a suspension strut receptacle or a link, made of a metal.

The first and second components 11 and 12 are connected releasably to each other via at least one connecting screw 13. More particularly, a drive-in bushing 14 is inserted into the fiber-reinforced plastic of the first component 11 and directly engages the fiber-reinforced plastic of the first component 11.

FIG. 1 shows a first embodiment of a drive-in bushing 14 with a sleeve-like basic body 15 made from metal. The sleeve-like basic body 15 of the drive-in bushing 14 has no thread on an external wall 16, but has an internal thread 18 on an internal wall 17. The drive-in bushing 14 can be driven into a recess in the fiber-reinforced plastic of the first component 11. A screw 13 that penetrates a recess in the second component 12 can be screwed into the internal thread 18 on the internal wall 17 of the drive-in bushing 14.

A collar 19 protrudes radially from one end portion of the external wall 16 of the basic body 15 and restricts the drive-in depth of the drive-in bushing 14 into the recess of the first component 11. A corresponding counterstop 20 is formed in the recess in the first component 11, and engages collar 19 comes to bear when the drive-in bushing 14 is driven into the recess of the first component 11.

At least one groove 21 is formed into the external wall 16 of the basic body 15 and function as a spreading groove for adhesive positioned between the drive-in bushing 14 and the first component. The adhesive secures the drive-in bushing 14 non-releasably to the fiber-reinforced plastic of the first component 11. The adhesive preferably is a micro-encapsulated adhesive with microcapsules that contain adhesive and/or hardener. The microcapsules of the micro-encapsulated adhesive are destroyed as the drive-in bushing 14 is driven into the recess of the first component 11. As a result, the adhesive and the hardener mix and the adhesive is cured as a consequence of a chemical reaction. The grooves 21 ensure optimum distribution of the adhesive between the drive-in bushing 14 and the first component 11.

In FIG. 1, at least one groove 21 extends in the axial direction and a plurality of grooves 21 extend in the circumferential direction with a defined pitch or inclination in relation to the axial direction.

In the embodiment of FIG. 1, micro-encapsulated adhesive 22 of this type is applied to the external wall 16 of the drive-in bushing 14 over the entire axial extent and circumferential extent of the external wall 16 of the sleeve-like basic body 15 of the drive-in bushing 14.

A further projection 23 is formed on the external wall 16 of the sleeve-like basic body 15 of the drive-in bushing 14 and prevents rotation for the drive-in bushing 14 in the recess in the fiber-reinforced plastic of the first component 11. The projection 23 is a separate sliding block.

Figure 2:
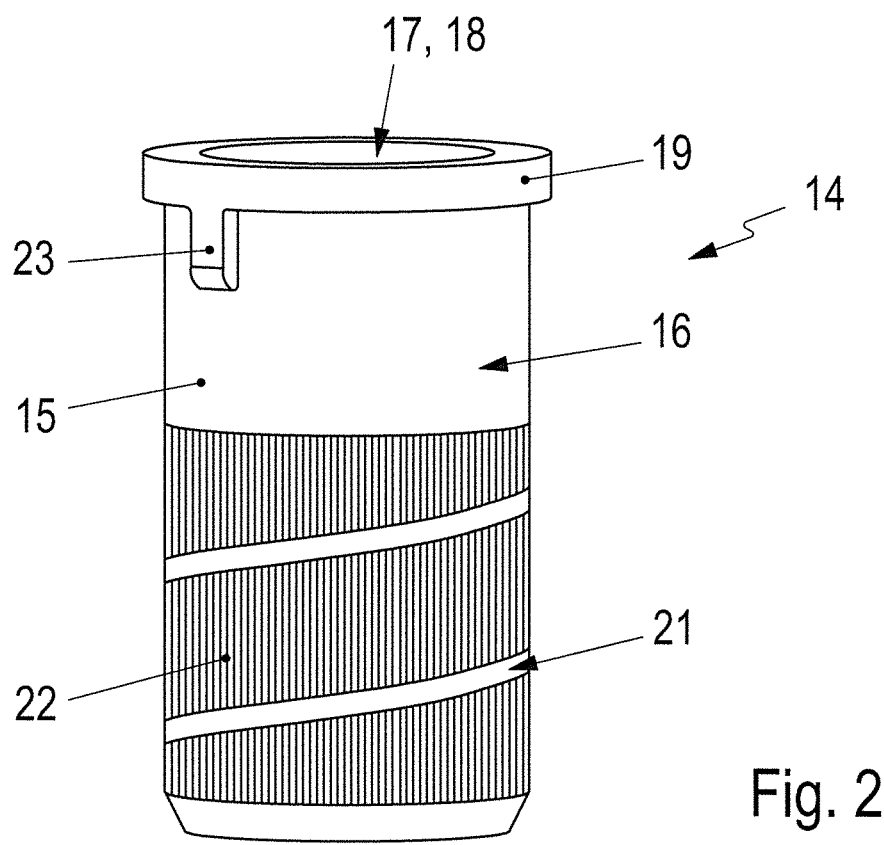
FIG. 2 is a perspective view of a second drive-in bushing according to the invention.

FIG. 2 shows a further embodiment of a drive-in bushing 14 according to the invention. The drive-in bushing 14 of FIG. 2 corresponds to the drive-in bushing 14 of FIG. 1.

In contrast to the embodiment of FIG. 1, the means for securing against rotation in the embodiment of FIG. 2 is a separate projection 23 designed as a sliding block, but rather by a projection 23 of the collar 19 that restricts the drive-in depth of the drive-in bushing 14.

In the embodiment of FIG. 2, the micro-encapsulated adhesive 22 is not applied over the entire axial extent of the external wall 16 of the sleeve-like basic body 15 of the drive-in bushing 14, but merely along a section that is spaced from the collar 19 and on which a helical or spiral groove 21 is formed. The groove 21 functions, as a spreading groove for the adhesive 22.

The recess of the first component 11 has a length that corresponds to the thickness of the first component 11. Therefore the recess completely penetrates the first component 11. The length of the drive-in bushing 14 corresponds to the thickness of the first component 11.

Each drive-in bushing 14 is driven into the fiber-reinforced plastic of the first component 11 with an adhesive between the drive-in bushing and the fiber-reinforced plastic of the first component 11. Thus, the respective metallic drive-in bushing 14 is connected non-releasably to the fiber-reinforced plastic of the first component 11.

Figure 3:
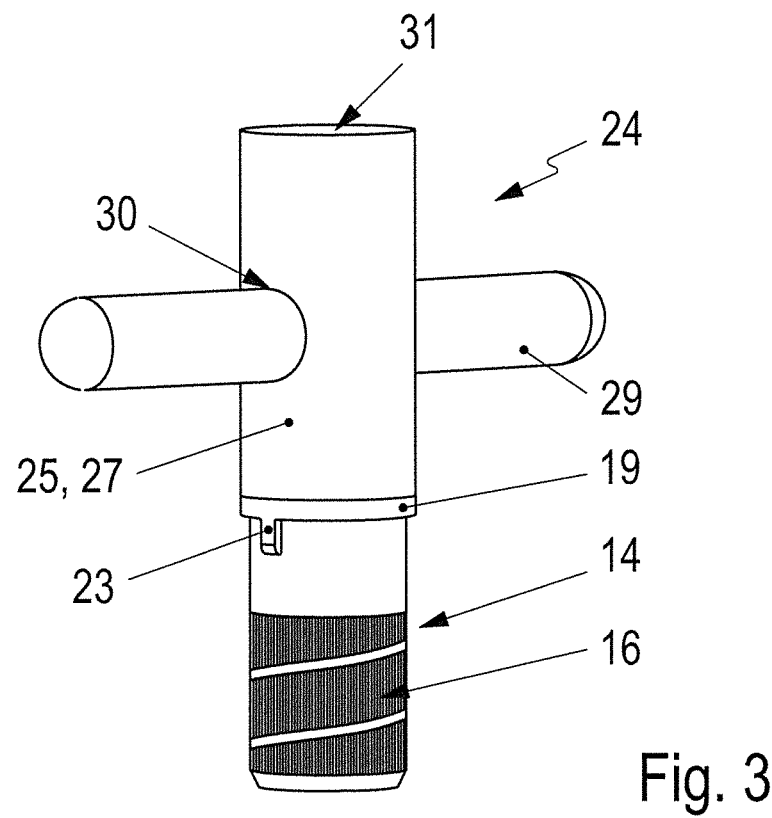
FIG. 3 shows the drive-in bushing of FIG. 2 together with a tool.
Figure 4:
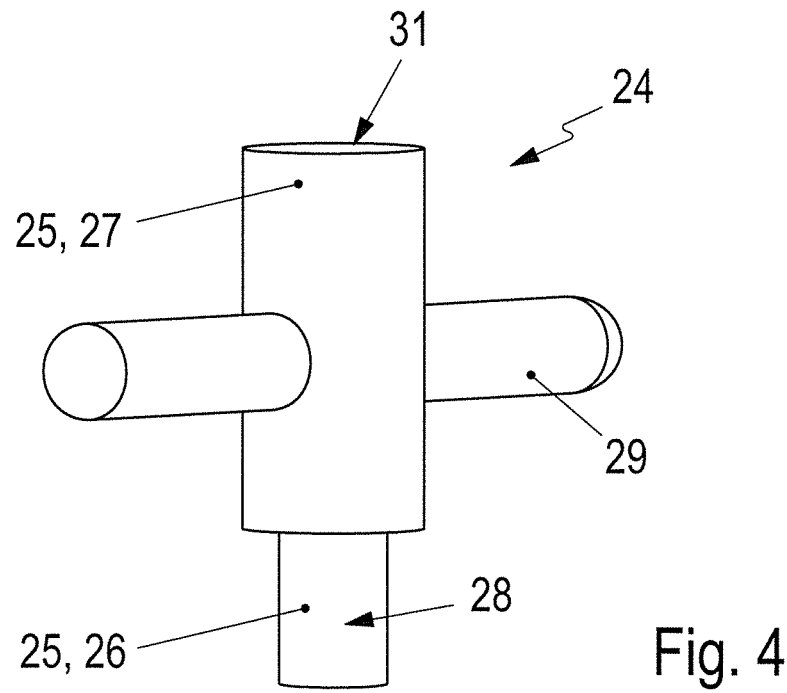
FIG. 4 shows the tool of FIG. 3 without the drive-in bushing.

A tool is used to drive the metallic drive-in bushing 14 into the respective recess in the fiber-reinforced plastic of the first component 11, as shown in FIGS. 3 to 6. FIG. 3 shows the tool 24 according to the invention together with a drive-in bushing 14. FIG. 4 shows the tool 24 without the drive-in bushing. FIGS. 5 and 6 show the individual assemblies of the tool 24.

The tool 24 has a basic body 25 with a threaded section 26 and a drive-in section 27. An external thread 28 is formed on the threaded section 26 of the basic body 25 of the drive-in tool 24, and the external thread of the basic body 25 of the drive-in tool 24 can be screwed to the internal thread 18 formed on the internal wall 17 of the drive-in bushing 14. The drive-in tool 24 comprises a lever rod 29 to facilitate screwing of the basic body 25 of the drive-in tool 24 into the drive-in bushing 14. The lever rod 29 can be inserted into a recess 30 in the basic body 25. Thus, the lever rod 29 can apply a torque for screwing the basic body 25 of the drive-in tool 24 to the drive-in bushing 14.

The recess 30 that receives the lever rod 29 is formed into the drive-in section 27 of the basic body 25 of the drive-in tool 24, in such a manner that, after the lever rod 29 has been inserted into the recess 30, the axial direction of the lever rod 29 extends perpendicular to the axial extent of the basic body 25.

The drive-in tool 24 and drive-in bushing 14 can be positioned in the state shown in FIG. 3. A hammer or other tool can be used to apply an impact to an end surface 31 of the drive-in section 27, and hence the end of the basic body 25 that is opposite the threaded section 26, to drive the drive-in bushing 14 can be driven into the recess in the first component 11.

The threaded section 26 of the basic body 25 of the drive-in tool 24 can be unscrewed from the drive-in bushing 14 after the drive-in bushing 14 has been driven into the recess of the first component 11. The projection 23 of the drive-in bushing 14 engages the fiber-reinforced plastic rotation of the first component 11 to, prevent rotation of said drive-in bushing. As explained above, the collar 19 of the drive-in bushing 14 restricts the drive-in depth into the first component 11.

The second component 12 is connected releasably to the first component 11 via at least one screw 13 after the drive-in bushing 14 has been driven into the recess of the fiber-reinforced plastic of the first component 11. Each screw 13 penetrates a recess in the second component 12 and is screwed releasably into the internal thread 18 of the respective drive-in bushing 14.

As can be gathered from FIG. 7, the drive-in direction 33 of the drive-in bushing 14 into the first component 11 runs in an opposed manner to the screwing-in direction 32 of the respective connecting screw 13 into the drive-in bushing 14.

The recess in the second component 12 can have an internal thread 35 that can interact with the external thread 34 of the respective connecting screw 13.

What is claimed is:

1. A motor vehicle structure, comprising: a first component manufactured from a fiber-reinforced plastic and having at least one recess extending therethrough; a second component manufactured from fiber-reinforced plastic or metal and having an opening penetrating therethrough, the second component being positioned in surface-to surface contact with the first component so that the opening in the second component registers with the recess in the first component; at least one drive-in bushing having a sleeve-like basic body manufactured from metal and having an external surface formed without a thread, and an internal surface with an internal thread, the basic body being driven into the recess in the fiber-reinforced plastic of the first component; and at least one screw penetrating through the opening in the second component from a surface of the second component facing away from the first component and screwed into the internal thread of said drive-in bushing for releasably connecting the first and second components together.

2. The motor vehicle structure of claim 1, further comprising adhesive between the external wall of the drive-in bushing and the recess in the first component to bond the drive-in bushing non-releasably to the first component.

3. The motor vehicle structure of claim 2, further comprising at least one groove formed in the external wall of the basic body to accommodate a spreading of the adhesive between the drive-in bushing and the first component.

4. The motor vehicle structure of claim 3, wherein the groove extends helically or spirally on the external wall of the basic body.

5. The motor vehicle structure of claim 1, further comprising a collar protruding radially out from the external wall at one end of the basic body for restricting a drive-in depth of the drive-in bushing into the recess of the first component.

6. The motor vehicle structure of claim 1, further comprising a projection formed on the external wall of the basic body and aligned for preventing rotation.

7. The motor vehicle structure of claim 1, wherein a length of the recess in the first component corresponds to a thickness of the first component so that the recess completely penetrates the first component.

8. The motor vehicle structure of claim 7, wherein a length of the drive-in bushing corresponds to the thickness of the first component.

9. A tool for producing a motor vehicle structure of that has a first component manufactured from a fiber-reinforced plastic and having at least one recess formed therein, a second component manufactured from fiber-reinforced plastic or metal and having an opening penetrating therethrough, at least one drive-in bushing having a sleeve-like basic body manufactured from metal and having an external wall formed without a thread, and an internal wall with an internal thread, the basic body being driven into the recess in the fiber-reinforced plastic of the first component, and at least one screw penetrating through the opening in the second component and screwed into the internal thread of said drive-in bushing for releasably connecting the first and second components together, the tool comprising:
a basic body having a threaded section and a drive-in section, the threaded section being threadedly engageable with the internal thread on the internal wall of the drive-in bushing, and wherein the drive-in section is configured for receiving an impact for driving the drive-in bushing into the recess in the fiber-reinforced plastic of the first component.

10. The tool of claim 9, further comprising a lever rod that can be introduced into a recess in the drive-in section of the basic body and via which the basic body can be rotated relative to the drive-in bushing for screwing the threaded section into the drive-in bushing.

11. A method for producing a motor vehicle structure, comprising the steps:
providing a first component made from a fiber-reinforced plastic and having a recess extending therethrough;
providing a second component made from a fiber-reinforced plastic or metal and having an opening extending therethrough;
providing at least one drive-in bushing having a sleeve-like basic body manufactured from metal and having an external surface formed without a thread, and an internal surface with an internal thread;
applying an adhesive to at least one of the recess in the first component and the external surface of the drive-in bushing, the adhesive having microcapsules that contain the adhesive and/or microcapsules that contain a hardener;
driving the drive-in bushing into the recess in the fiber-reinforced plastic of the first component so that the microcapsules break and cause the adhesive to mix with the hardener for curing the adhesive and bonding the drive-in bushing in the recess;
positioning the first and second components in surface-to-surface contact so that the opening in the second component registers with the recess in the first component;
screwing the second component to the first component via at least one screw penetrating the recess in the second component, wherein the respective screw is screwed releasably into the internal thread of the drive-in bushing.

* * * * *